United States Patent Office 3,156,585
Patented Nov. 10, 1964

3,156,585
HERMETICALLY SEALED STORAGE BATTERIES
Masaru Yamano and Hironosuke Ikeda, Hirakata-shi, Japan, assignors to Sanyo Electric Co., Ltd., Moriguchi-shi, Japan, a corporation of Japan
Filed Apr. 11, 1962, Ser. No. 187,159
Claims priority, application Japan, July 18, 1961, 36/36,805
7 Claims. (Cl. 136—6)

This invention relates to hermetically sealed electrical storage batteries having positive and negative electrode plates disposed in concentric relations.

The primary object of the present invention is to provide electrical storage batteries of the kind specified which are easy for assembling, good in electrical contact for electrode plates, and simple in construction for connection of terminal elements to the central electrodes.

There are other objects and particularities of the present invention which will be obvious in the following description with reference to the accompanying drawings in which, FIG. 1 is a vertical sectional view of a storage battery embodying the present invention;

Figure 1:
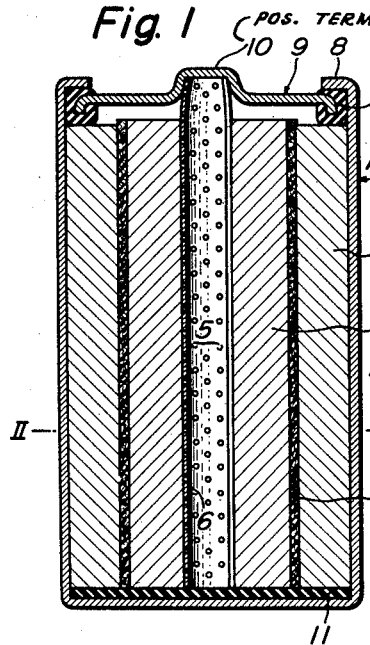
Figure 2:
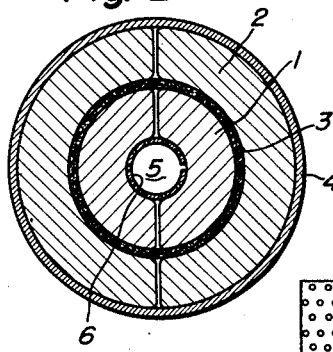
FIG. 2 is a cross-sectional view of the battery shown in FIG. 1, the section being taken at line II—II in FIG. 1.

Referring to FIGS. 1 and 2, the storage battery is of generally cylindrical configuration comprising concentrically disposed positive and negative electrodes 1 and 2. Each electrode is of a hollow cylindrical form and composed of a plurality of identical parts of part-cylindrical form, all such parts conjointly forming a hollow cylindrical electrode. In the embodiment shown, two semi-cylindrical parts are disposed in opposition to each other to form a hollow cylindrical electrode.

Between the two electrodes 1 and 2 is interposed a barrier layer or separator 3, known per se, composed of synthetic resin fibres, and the whole assembly is enclosed within a hollow cylindrical casing 4 formed of nickel-plated steel sheet.

Figure 5:
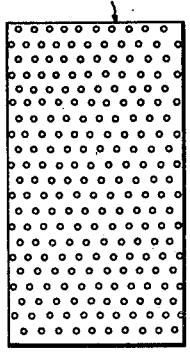
FIG. 5 is a plan view of a conducting plate before it is formed into the central conducting sleeve shown in the preceding figures.

The inner electrode 1 defines thereinside a central bore 5, and a resiliently expandable sleeve 6 made of resilient plate of electrically conducting material rolled into a split tube is inserted into the bore 5. The resilient plate may be a nickel-plated steel plate, and is provided with a great number of small perforations as shown in FIG. 5. The sleeve 6 tends to expand outwardly by its resiliency to make good pressure contact with the inner electrode 1 and also to secure good pressure contact between the electrodes and the separator. The sleeve plate may be shaped into a wavy form in order to secure positive electrical contact all over the inner surface of the bore 5.

The conducting sleeve 6 is also held in electrical contact with a cover plate 9 which is secured to the inner flange 8 formed on the open end of the casing 4 through an insulating and packing seal 7. The central portion of the cover plate 9 is pressed out to form a central recess open inwardly, into which the top end of the conducting sleeve 6 is forced to fit with suitable contact pressure therebetween. The outer projection 10 corresponding to the central recess forms one terminal of the battery. The outer electrode 2 is in direct contact with the metal casing 4 which provides the other terminal.

Figure 3:
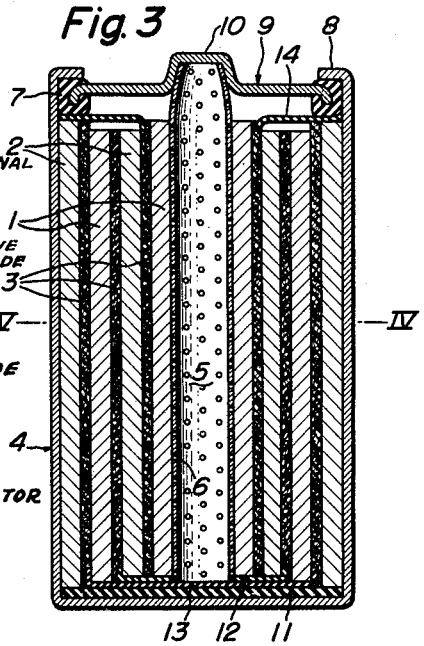
FIG. 3 is a vertical sectional view of another embodiment of the invention.
Figure 4:
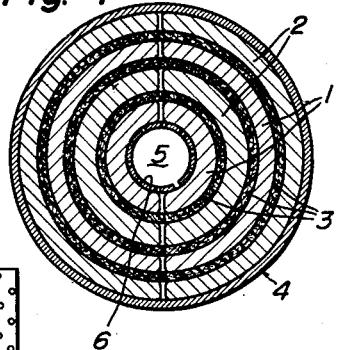
FIG. 4 is a cross-sectional view along line IV—IV in FIG. 3.

The storage battery may comprise a plurality of concentric positive electrodes and the same number of concentric negative electrodes as shown in FIGS. 3 and 4. In this case, positive and negative electrodes 1, 1 and 2, 2 should be disposed alternately, with respective barrier layers or separators 3, 3 interposed therebetween. Each hollow cylindrical electrode is composed of a plurality of, say two, part-cylindrical or semi-cylindrical elements. The innermost electrode 1 defines a central cylindrical bore 5, in which an outwardly expandable resilient sleeve 6 is inserted, just as in the embodiment shown in FIGS. 1 and 2. The top end of the sleeve 6 is held in position by pressure fit in the central recess formed in the cover plate 9.

An insulating disc 11 should be placed flat on the bottom surface of casing 4. Insulating papers 12, 13, 14 should preferably be disposed under the electrode cylinders as well as above the electrical cylinders in order to secure requisite electrical insulation.

In general, in a storage battery consisting of positive and negative cylindrical electrodes disposed concentrically, the innermost electrode is an integral or split type of solid cylinder of columnar shape, and the active substances in its central portion cannot be utilized in full or at a high efficiency. Consequently, the transfer to the opposing electrode of diffusing gas necessary for reactional consumption of the internally generated gas is difficult to occur, resulting in useless existence of active substances in the central portion.

According to the invention, the innermost electrode is also a hollow cylinder composed of a plurality of part-cylindrical elements, with a perforated resilient sleeve fitting in the central bore, and there is provided a space in the centre of the battery which functions as a diffusion space. The resilient sleeve 6 can readily be inserted into the central bore 5 by merely contracting the sleeve radially, and the sleeve 6 tends to expand within the bore by its own resiliency to establish positive pressure contact of the same with the innermost or central electrode 1 as well as between the electrodes and separators. The connection of the central electrode to the corresponding terminal is also effected in a simple and positive manner by the mere pressure fit of the resilient sleeve 6 into the central recess formed in the cover plate 9. Thus, according to the present invention, the battery can readily be assembled in a very simple manner.

The positive and negative electrodes may be either sintered or compressed type. Sintered electrode elements may be formed by nickel powders which are sintered and held on base networks of nickel-plated metal wires embedded in the sintered bodies. The active substances are impregnated into the sintered body, cadmium salts into the cathodes and nickel salts into the anodes. For compressed electrode elements, cathode elements are molded under pressure from a mixture of cadmium hydrate and nickel, carbon or like conducting material in powdered form, while anode elements are from a mixture of powdered nickel hydrate and conducting material. Nickel-plated metal screens may be used as the bases or cores. The electrode elements are activated and formed as usual. Since the formulations per se of cathodes and anodes are not the essential features of the invention, any further description thereon will not be necessary.

What is claimed is:

1. A sealed secondary storage cell comprising a hollow casing of electrically conductive material, positive and negative electrodes which are hollow and of the same general shape as the casing disposed concentrically within said casing, each of said electrodes being divided into at least two parts generally along the longitudinal axis of said casing, a first insulating member separating said electrodes, an electrolyte, an outwardly expandable sleeve of electrically conductive material inserted in the central opening defined by the hollow electrode which is innermost of said casing, resilient means for insulating said expandable sleeve and one of said electrodes from said casing, a cover plate for sealing said casing electrically connected to said sleeve, and a member for insulating said cover plate from said casing, said sleeve expanding outwardly to make electrical contact with the parts of the innermost electrode and exerting a force radially thereto which in turn is transmitted to the parts of the outermost electrode thereby urging the parts of the outermost electrode into electrical conducting relationship with said casing.

2. A sealed electric storage battery as set forth in claim 1 wherein said expandable sleeve is hollow and has a plurality of openings therein.

3. A sealed secondary storage cell as set forth in claim 1 wherein each of said electrodes is formed by two separate semi-cylinders.

4. A sealed secondary storage cell comprising a hollow casing of electrically conductive material forming one terminal of said battery, said casing being of generally cylindrical shape and being closed at one end thereof, positive and negative hollow cylindrical electrodes disposed concentrically within said casing, each of said electrodes being formed by two separate semi-cylinders, a porous insulating sleeve member of resilient material for separating said electrodes, an electrolyte, an outwardly expandable member of electrically conducting material inserted in the central bore defined by the electrode which is innermost of said casing, a cover plate, including terminal means for sealing the other end of said casing, means for electrically connecting the terminal means of said cover plate to said expandable member to provide a terminal external to said casing, means for insulating one end of said electrodes and said expandable member from said casing and means for insulating said cover plate from said casing, said expandable member expanding outwardly to make electrical contact with the half cylinders of the innermost electrode and exerting forces radial thereto which in turn are transmitted against the half cylinders of the outermost electrode thereby to urge the half cylinders of the outermost electrode into electrical conducting relationship with said casing.

5. A sealed secondary storage cell comprising a hollow casing of electrically conductive material, a plurality of positive and negative electrodes which are hollow and of the same general shape as the casing disposed alternately and concentrically within said casing, each of said electrodes being divided into at least two parts generally along the longitudinal axis of said casing, first porous resilient insulating means separating adjacent ones of said positive and negative electrodes, an electrolyte, an outwardly expandable member of electrically conducting material inserted in the opening defined by the hollow electrode which is innermost of said casing, second means for insulating selected ones of said electrodes and said expandable member from said casing, a cover plate for sealing said casing, means electrically connecting said expandable member to said cover plate, and a third means for insulating said cover plate from said casing, said expandable member expanding outwardly to make electrical contact with the parts of the innermost electrode and exerting a force radial thereto which in turn is transmitted to the parts of the next adjacent electrodes to thereby urge the parts of the other electrodes outwardly so that the parts of the outermost electrode are urged into electrical conducting relationship with said casing.

6. A sealed electric storage battery as set forth in claim 5 wherein said expandable member is hollow and has a number of holes therein to provide an electrolyte free space.

7. A sealed secondary storage cell as set forth in claim 5 wherein each of said electrodes is formed by two separate semi-cylinders.

References Cited in the file of this patent

UNITED STATES PATENTS

| | | |
|---|---|---|
| 588,189 | Sherrin | Aug. 17, 1897 |
| 1,402,956 | Politowski | Jan. 10, 1922 |
| 2,469,508 | Malki et al. | May 10, 1949 |
| 2,611,792 | Andre | Sept. 23, 1952 |
| 2,980,747 | Daley | Apr. 18, 1961 |

FOREIGN PATENTS

| | | |
|---|---|---|
| 531,774 | Great Britain | Jan. 10, 1941 |
| 697,198 | Great Britain | Sept. 16, 1953 |